Feb. 20, 1923. Re. 15,546

F. K. LAWRENCE

TIRE RACK

Original Filed Jan. 4, 1921 2 sheets-sheet 1

Inventor:
Frederick K. Lawrence
By Cheever & Cox Attys.

Feb. 20, 1923. Re. 15,546

F. K. LAWRENCE

TIRE RACK

Original Filed Jan. 4, 1921 2 sheets-sheet 2

Inventor:
Frederick K. Lawrence
By Cheever & Cox Att'ys.

Reissued Feb. 20, 1923. Re. 15,546

UNITED STATES PATENT OFFICE.

FREDERICK K. LAWRENCE, OF CHICAGO, ILLINOIS, ASSIGNOR, BY DIRECT AND MESNE ASSIGNMENTS, TO SELF-MOUNTING CARRIER COMPANY, OF WILMINGTON, DELAWARE, A CORPORATION OF DELAWARE.

TIRE RACK.

Original No. 1,364,442, dated January 4, 1921, Serial No. 384,459, filed May 26, 1920. Application for reissue filed September 25, 1922. Serial No. 590,542.

*To all whom it may concern:*

Be it known that I, FREDERICK K. LAWRENCE, a citizen of the United States, residing at Chicago, in the county of Cook and State of Illinois, have invented a certain new and useful Tire Rack, of which the following is a specification.

My invention relates to tire racks, more particularly for carrying the spare rims and tires of motor vehicles. The object of the invention is to provide a rack or carrier of improved type having one or more of the following characteristics:—capable of lowering the tire to the ground; capable of thereafter lowering the supporting seat so that the operator can then roll it away without lifting away or dragging it from a supporting portion of the rack; being provided with force multiplying mechanism composed of rigid members by which the tire and tire mounting may be raised and lowered with a minimum of physical exertion on the part of the operator; being adapted to hold the tire suspended whereby it may hang approximately vertical at all times and when delivered to the ground is in upstanding position; having a seat which prevents shifting of the tire transversely to its plane; having a stationary stop for limiting the movement of the tire when it is being moved to traveling position; constituting a combined elevator and carrier and not merely a detachable tire lifting tool. These characteristics are not all broadly new in themselves but as to those which are not—they have been obtained by improved means and they have combined in a novel manner. Another object is to provide means whereby when the parts are in condition for travel the tire and rim may be readily and securely locked to the rack to prevent them from jarring loose and to prevent them from being stolen.

I accomplish my objects by the mechanism illustrated in the accompanying drawings in which—

Like numerals denote like parts throughout the several views.

Figure 3:
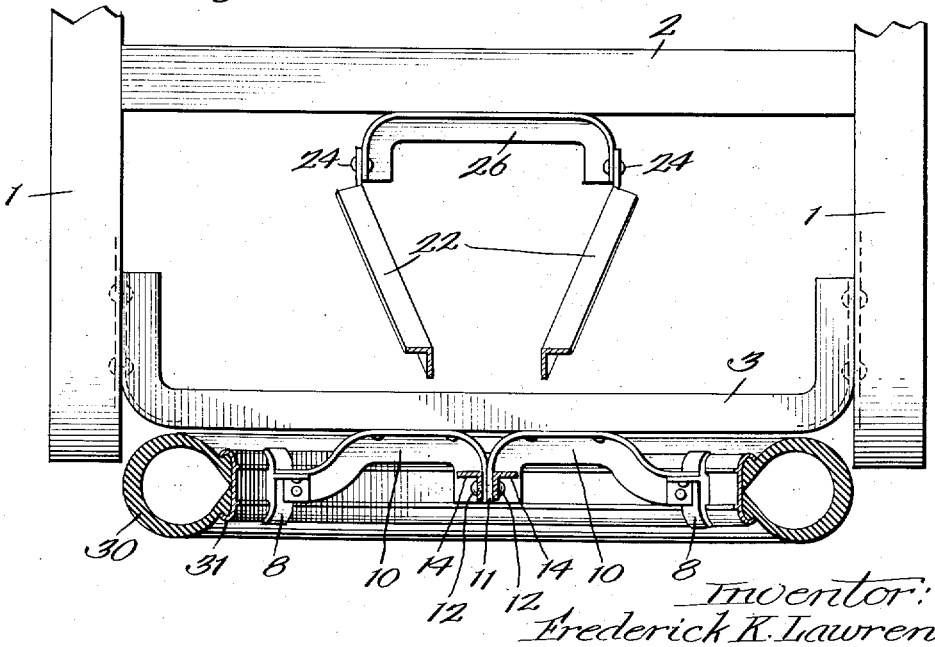
Figure 3 is a plan view showing the rear portion of the chassis of the vehicle with the tire locked in position theron and the spare rim and tire in place, the latter being in axial section.

The construction of motor vehicles varies somewhat, of course, but a typical construction is shown in which the chassis has two side frame members 1—1 and a cross frame member 2, as best shown in Figure 3. The vehicle may have any suitable type of body 4 and wheels 5.

Referring now more particularly to the rack itself, it may be mounted on a special bar 3, provided for the purpose and fastened to the members 1, the rack having two fixed shoes or rim seats 8—8 and one movable one 9. These fixed seats form stops and while they may be secured in any suitable manner, according to the present design they are fastened to the ends of bowed angle irons 10—10 fastened to the member 3. The inner bowed ends 11 of the bars abut each other and form a support for a pivot pin 12 which carries the hand link member. This hand link member, as illustrated, is composed of two angle irons 14—14 spaced slightly apart and having, approximately at their mid length, a pivot pin 16. At the upper end are fastened two handle bars 17—17 by which the hand link member may be rotated about its pivot 12. It will be noted that this hand link constitutes a lever of the second class fulcrumed on the vehicle.

Figure 5:
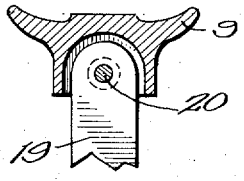
Figure 5 is a fragmentary sectional view showing the hinge construction by which the upper rim seat is pivotally connected to its supporting link.
Figure 4:
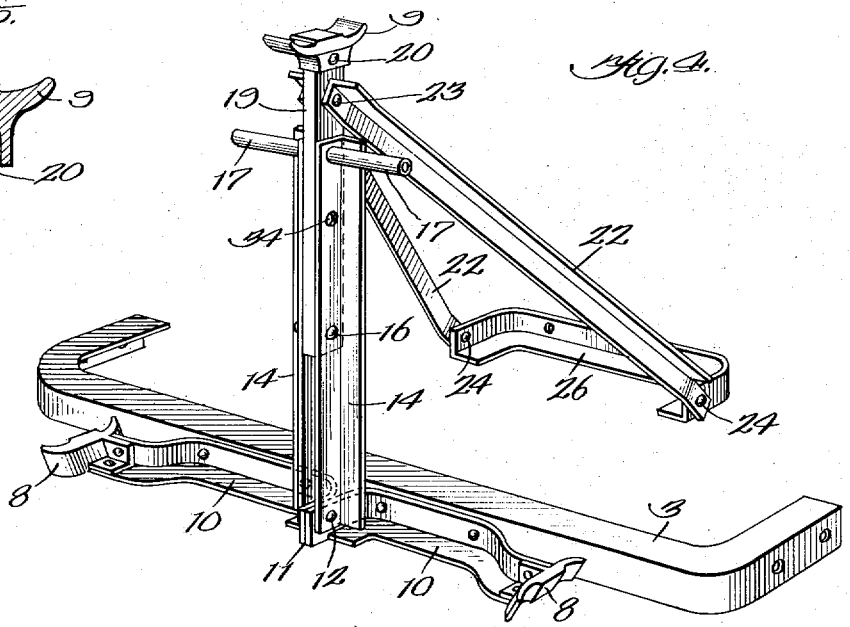
Figure 4 is a perspective of the parts shown in Figure 3 but with the rim and tire absent.

Pivotally supported upon pin 16 is a link 19 which lies between the bars 14 and at its upper end has a pivot pin 20 upon which the upper rim seat 9 is articulately mounted. The construction is shown in detail in Figure 5. Two bars 22, 22 are pivotally secured by a pin 23 to the upper end of link 19 just below seat 9. At their lower end they are secured by pivot pins 24, 24 to the bowed ends of an angle bar 26 rigidly fastened to the cross member 2 as shown in plan in Figure 3 and in perspective in Figure 4. These bars 22 functionally constitute what may be termed a "controlling link" as they confine the travel of the pivot pin 23 to the arc of the circle centered at the pins 24.

Figure 1:
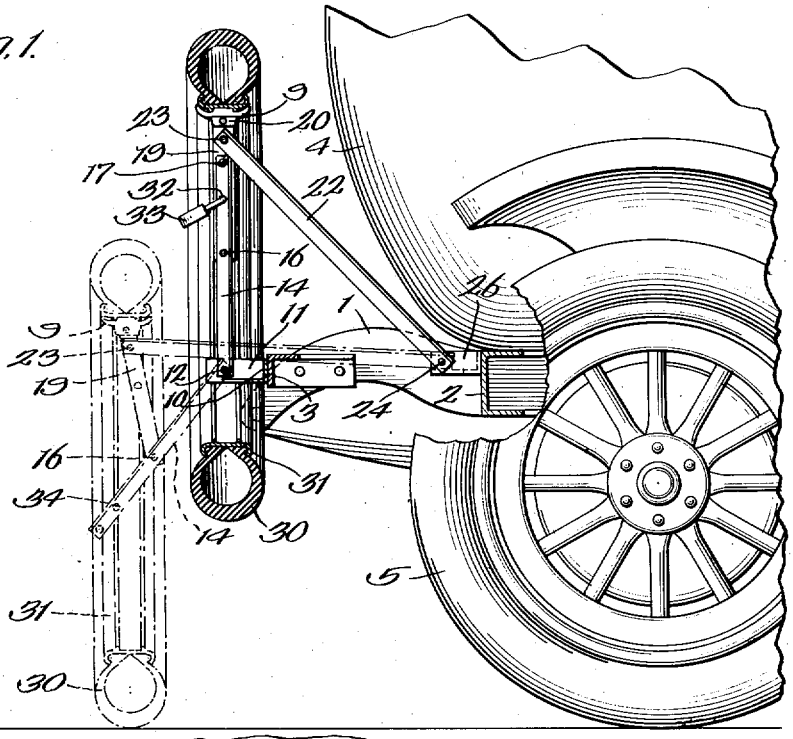
Figure 1 is an assembly view from the side of the vehicle showing the device installed.
Figure 2:
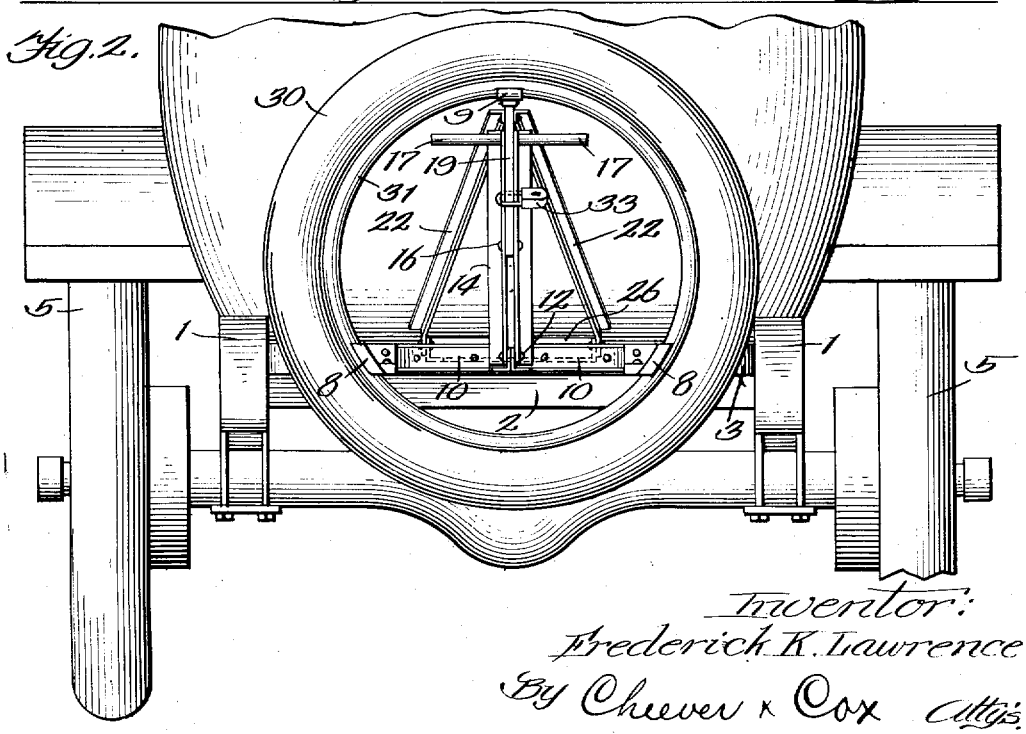
Figure 2 is an assembly drawing viewing the parts from the rear of the vehicle.

Operation: Let it be assumed that the spare tire 30, equipped with its demountable rim 31, is resting upon the ground as shown in Figure 1. To raise the rim and tire to traveling position shown in full lines in Figure 1 the operator lowers the handle 17 and brings the upper rim seat 9 into engagement with the rim as illustrated in dotted lines. It will be noted that when the parts are in the dotted line position the operator will obtain a good leverage for moving the link 19 upward for the reason that the lower end of the link is closer to the fulcrum pin 12 than is the handle 17. After the rim seat is adjusted to the rim the operator swings the handle upward and finally forward until the bars 14 reach vertical position, at which time the link 19 will also be vertical and the rim will be in close engagement with the fixed seats or stops 8. So long as the parts remain in these positions it will be impossible for the rim and tire to be removed because the parts interfit with the tire mounting and prevent shifting of the tire transversely to its plane. It will be observed that toward the later portion of the upward movement of the bars 14, as they come nearly into line with the line 19, a true toggle action occurs. In other words, the parts 14 and 19 form two links of a toggle and of course as they straighten out they exert great upward pressure on the upper rim seat. Thus the rim may be tightly engaged. This has at least two advantages; first it prevents the rim from being forced out of engagement with the seat and second, it prevents rattling. The parts may be locked in this position by passing the bow 32 of a padlock 33 through the apertures 34 formed in the bars 14 and link 19 in line with each other as indicated in the drawing. So long as the padlock remains in position the toggle cannot be "broken" nor the link 19 lowered.

When the operator desires to lower the tire from traveling position he removes the padlock, grasps the handles and brings them toward him until the parts have reached the dotted line position shown in Fig. 1, that is, until the tire actually rests upon the ground. Of course the rim leaves the fixed seats or stops 8 at the beginning of the downward movement and is thereafter carried only by the upper seat 9, hence after the tire has reached the ground it may be released by simply lowering the seat 9 a little farther, sufficiently to permit the rim to clear it. It is of great advantage to be able to thus lower the tire fully to the ground for it renders it unnecessary for the operator to do any hand lifting directly on the rim or tire. A demountable rim and tire are frequently too heavy and frequently too dusty or muddy to lift conveniently and it is of great convenience to be able to lower them directly to the ground. With my device the tire can be let down, disengaged and rolled away with very little physical exertion.

Another advantage of the particular design shown is that the maximum force required of the operator is called for at a time when he is best able to exert it, that is, when the handles are nearest to the ground. This will be evident by reference to the dotted lines shown in Figure 1. As the handles approach their uppermost position they are not in such a convenient position for lifting, and this is the time when the toggle action is most in evidence, and hence the least amount of force is required. It will be noted that the movable seat 9 engages the tire mounting in such manner that the tire hangs suspended, with the result that it maintains approximately vertical position throughout its movement from lowered position where it rests upon the ground to traveling position where it is in engagement with the fixed stops or seats 8. In other words, the tire is not rotated about either a vertical or horizontal axis. Moreover, it is delivered to the ground in upstanding position, which is convenient for the operator who rolls away the tire or rolls the tire to the device. It will also be observed that the movable seat travels in a fixed path, which is arcuate or curvilinear and confined to a vertical plane.

Having thus described my invention what I claim as new and desire to secure by Letters Patent is:—

1. Lifting mechanism for spare tires and their mountings having a rigid member pivoted at its inner end to the vehicle so as to swing in a vertical plane, and having means at a distance from the inner end for suspending the tire mounting, said means being adapted to prevent the tire mounting from shifting along said rigid member, and said rigid member having means at the outer end for swinging it vertically to thereby lift and lower the tire from and to the ground.

2. The combination, with a motor vehicle, of a tire rack having a seat adapted to support the tire mounting and permit the same to hang pendant in a substantially vertical plane during raising and lowering, said seat being also adapted to engage the tire mounting to prevent shifting relatively to the seat during raising and lowering, and a rigid element pivoted to the vehicle and adapted to operate the seat throughout a range sufficient to lower the tire to the ground and to raise it to traveling position on the vehicle.

3. The combination, with a motor vehicle, of a tire rack for raising, lowering and transporting tires and their mountings, said rack having a fixed seat secured to the vehicle and adapted to be engaged by the tire mounting when the latter is in traveling position, and a movable seat adapted to engage the tire mounting and preventing shifting thereof relatively to the seat during raising and lowering, the movable seat being adapted to suspend the tire and its mounting in substantially vertical position during raising and lowering; and means adapted to raise the movable seat from a position where the tire will rest upon the ground to one where the tire mounting will engage the fixed seat.

4. In combination with a motor vehicle, a tire rack having a seat for supporting the tire, said seat being movable, and its movement being confined to a vertical plane transverse to the plane of the tire, and said seat being adapted to engage the tire mounting and prevent the same from shifting relatively to the seat in a direction perpendicular to the plane of the tire; and force-multiplying mechanism for raising and lowering the seat, said mechanism being composed of rigid elements and adapted to lower the tire to the ground.

5. A tire rack having a seat for supporting the tire, a lever adapted to raise and lower the seat through an arcuate path lying in a vertical plane, a handle for said lever occupying a position further from the vehicle than the plane of the tire when the latter is in lowered position, said seat being adapted to engage the tire mounting to prevent the latter from shifting transversely to the plane of the tire, and the seat being adapted to suspend the tire in a substantially vertical plane throughout the raising and lowering movements.

6. In a device of the class described, a stationary stop adapted to limit the movement of the tire mounting when the latter is being raised, a movable seat adapted to raise and lower the tire into and out of contact with said stop, means for guiding the movable seat in an arcuate path in a vertical plane, and inflexible power-multiplying mechnism for moving the movable seat, the movable seat being adapted to engage the tire mounting and prevent it from shifting transversely to its plane.

7. In a device of the class described, the combination, with a motor vehicle, of a stop mounted in fixed position thereon for limiting the movement of the tire mounting when the latter is being raised to traveling position, a movable seat adapted to move the tire mounting into contact with said stop and adapted to lower the tire to the ground, the seat being movable in a curvilinear path arranged in a vertical plane, and inflexible, force-multiplying mechanism for raising and lowering the seat, the seat being adapted to hold the tire mounting against shifting perpendicular to its plane during the ascent and descent.

8. In a carrier for spare wheels and the like, a stop against which the tire mounting may rest when in traveling position, said stop being adapted to be affixed to the vehicle, a movable seat adapted to support the tire, and inflexible, force-multiplying mechanism, including a lever adapted to be fulcrumed on the vehicle, for lowering the tire to the ground and raising it along a definite curvilinear path until said tire mounting engages said stop.

9. In a carrier for spare wheels and the like, a stop against which the tire mounting may rest when in traveling position, said stop being adapted to be affixed to the vehicle, a movable seat adapted to support the tire, and inflexible, force-multiplying mechanism, including a lever adapted to be fulcrumed on the vehicle, for lowering the tire to the ground and raising it along a definite curvilinear path until said tire mounting engages said stop, said stop being adapted to interfit with the tire mounting when the latter is raised to prevent vibration thereof.

10. In a tire carrier, the combination, with a motor vehicle, of a stationary stop adapted to hold the tire mounting against vibration when in raised, traveling position, a movable seat for raising and lowering the tire, said seat having a range of movement capable of raising the tire from the ground into direct contact with the stop, and inflexible, force multiplying mechanism for raising and lowering the movable seat, including an element pivoted to the vehicle and supporting said seat, said seat being adapted to interfit with the tire mounting to prevent the latter from substantially varying its distance from the pivotal point of attachment of said element to the vehicle.

11. In a tire carrier the combination with a motor vehicle of a stationary stop adapted to interfit with the tire mounting to prevent vibration of the latter when raised to traveling position, a movable seat for raising and lowering the tire, said seat being movable in a curvilinear path in a vertical plane sufficiently to raise the tire from the ground and into contact with said stop, and inflexible, force-multiplying mechanism for raising and lowering the movable seat, the movable seat interfitting with the tire mounting to prevent the latter from shifting transversely to its plane.

12. A tire carrier having a fixed stop for limiting the movement of the tire toward traveling position, a seat for engaging the tire mounting and permitting it to hang suspended during raising and lowering, and seat operating means composed of rigid members, one of which is a lever adapted to be fulcrumed upon the vehicle and has a range of movement sufficient to raise the tire from a position in contact with the ground to a position in contact with said stop, said seat being adapted to interfit with the tire mounting for preventing the latter from shifting on the seat in a direction transverse to the plane of the tire.

13. In combination with a motor vehicle a tire rack having a seat for supporting the tire and a link work for raising and lowering the seat, the link work being adapted to let the tire down onto the ground and thereafter descend still farther to permit the seat to disengage the tire.

14. A tire rack adapted to be mounted on a motor vehicle and having a seat for engaging the tire and a pair of toggle links, one of which is connected to the seat and the other pivoted to a part of the vehicle, said links being approximately vertical when "straightened out," and means for rotating the last mentioned link about its axis, the toggle links being adapted to "break" far enough to cause the said seat to descend out of engagement with the tire when the latter is resting upon the ground.

15. In a device of the class described, a stationary seat adapted to engage the tire when the latter is raised up to it, a movable seat adapted to raise and lower the tire into and out of engagement with the stationary seat, means for guiding the movable seat, and links for moving the movable seat, the movable seat being adapted to be let down sufficiently to disengage the tire when the latter rests upon the ground.

16. In a device of the class described, the combination of a stationary seat for the tire, a movable seat for moving the tire into and out of engagement with the stationary seat, a hand link having a stationary pivot, a second link pivoted to the hand link between the ends of the latter, and a link for arcuately guiding the free end of the movable link.

17. A tire rack adapted to be mounted on a motor vehicle and having a stationary lower rim seat, a movable upper rim seat, a hand link having a fixed pivot at one end and a handle at the opposite end, a second link having said movable seat at its upper end and a pivot at its lower end by which it is pivoted to the hand link between the ends thereof, and a third link having a fixed pivot at one end and at the other end being pivotally attached to the upper end of the second link.

18. A tire rack having a stationary lower rim seat, a movable upper rim seat, a hand link having a fixed pivot at one end and a handle at the opposite end, a second link having said movable seat at its upper end and a pivot at its lower end by which it is pivoted to the hand link between the ends thereof, and a third link having a fixed pivot at one end and at the other end being pivotally attached to the upper end of the second link, the hand link and second link being substantially in alinement when the movable seat is at a sufficient elevation to cause the rim to engage the stationary seat.

19. A tire rack having a stationary lower rim seat, a movable upper rim seat, a hand link having a fixed pivot at one end and a handle at the opposite end, a second link having said movable seat at its upper end and a pivot at its lower end by which it is pivoted to the hand link between the ends thereof, a third link having a fixed pivot at one end and at the other end being pivotally attached to the upper end of the second link, the hand link and second link being substantially in alinement when the movable seat is at a sufficient elevation to cause the rim to engage the stationary seat, and means for locking the hand link and the second link against relative movement when the latter are substantially in alinement.

20. Lifting mechanism for spare tires and their mountings comprising a rigid member having means at the outer end for supporting the tire mounting and permitting the same to hang pendant in a substantially vertical plane during raising and lowering, said means being adapted to prevent the tire mounting from shifting along said rigid member, the inner end of said rigid member being pivoted to the vehicle, and force-multiplying means for raising and lowering said rigid member to thereby raise and lower the tire and tire mounting to and from the ground.

21. Lifting mechanism for spare tires and their mountings comprising a rigid member having means at the outer end for holding the tire mounting suspended from it, said means being adapted to prevent the tire mounting from shifting along said rigid member, the inner end of said rigid member being pivoted to the vehicle, means on the vehicle for limiting the upward movement of the tire mounting, and force multiplying means for raising and lowering said rigid member to thereby lift the tire and tire mounting from the ground to traveling position and vice versa, said force multiplying means including a handle having an arcuate movement confined to a vertical plane and the path of movement of said handle lying chiefly at a greater distance from the vehicle than the plane of the tire.

22. Lifting mechanism for spare tires and their mountings having a stop on the vehicle for limiting the upward movement of the tire mounting, a lever of the second class pivoted to the vehicle for raising the tire mounting from the ground up to the stop, said lever having a handle, and means located at a fixed point on the lever between the handle and the lever pivot for supporting the tire mounting whereby the weight of the tire and its mounting is prevented from shifting along said lever.

In witness whereof, I have hereunto subscribed my name.

FREDERICK K. LAWRENCE.